US011986875B1

(12) United States Patent  
Gherini et al.

(10) Patent No.: US 11,986,875 B1  
(45) Date of Patent: May 21, 2024

(54) PASSIVE CONDUIT OR CABLE MODIFICATION DEVICE

(71) Applicant: National Technology & Engineering Solutions of Sandia, LLC, Albuquerque, NM (US)

(72) Inventors: Michael James Gherini, San Ramon, CA (US); Ryan K. Gehmlich, Mountain House, CA (US); Dorian K. Balch, Oakland, CA (US); Michael Christopher Maguire, Napa, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 135 days.

(21) Appl. No.: 17/899,735

(22) Filed: Aug. 31, 2022

Related U.S. Application Data

(63) Continuation-in-part of application No. 17/069,257, filed on Oct. 13, 2020, now Pat. No. 11,473,689.

(51) Int. Cl.  
*B21D 39/04* (2006.01)

(52) U.S. Cl.  
CPC .................................. *B21D 39/048* (2013.01)

(58) Field of Classification Search  
CPC ...... F16K 31/002; F16K 49/005; F03G 7/065; H02G 1/1212; H02G 1/1224; B21D 39/048

See application file for complete search history.

(56) References Cited

U.S. PATENT DOCUMENTS

| | | | |
|---|---|---|---|
| 3,055,631 A | | 9/1962 | Kippenhan |
| 3,497,175 A | | 2/1970 | Koland |
| 3,614,486 A | | 10/1971 | Smiley |
| 4,463,560 A | | 8/1984 | Greenleaf et al. |
| 4,448,680 A | | 12/1984 | Itoh |
| 4,586,335 A | | 5/1986 | Hosoda et al. |
| 4,811,564 A | | 3/1989 | Palmer |
| 4,945,727 A | | 8/1990 | Whitehead et al. |
| 5,092,360 A | * | 3/1992 | Watanabe ............ C04B 37/026 252/62.9 R |
| 5,129,753 A | * | 7/1992 | Wesley .................. B64G 1/222 403/328 |
| 5,622,482 A | | 4/1997 | Lee |
| (Continued) | | | |

*Primary Examiner* — Umashankar Venkatesan  
(74) *Attorney, Agent, or Firm* — Mark A. Dodd

(57) ABSTRACT

A passive modification device comprising an elongated body extending along a first axis made of a shape memory alloy with a threshold contraction along the first axis at a threshold temperature. The modification device further comprises a passageway extending along a second axis shaped to surround a conduit line extending along the second axis. The modification device further includes a first modifying structure on a first portion of the passageway and a second modifying structure on a second portion of the passageway opposite the first modifying structure. Contraction of the elongated body can cause the first modifying structure and the second modifying structure to move towards each other; where movement of at least one of the first modifying structure or the second modifying structures can be configured to modify the conduit line. The conduit line may comprise mechanical cables, electrical conductors, optical fibers, or brittle portions that readily shatter.

20 Claims, 18 Drawing Sheets

(56) References Cited

U.S. PATENT DOCUMENTS

| | | | | |
|---|---|---|---|---|
| 5,685,148 | A | * | 11/1997 | Robert .................... F03G 7/065 60/527 |
| 6,032,366 | A | * | 3/2000 | Tominaga ............ H02G 1/1212 83/947 |
| 6,279,869 | B1 | | 8/2001 | Olewicz |
| 6,499,952 | B1 | * | 12/2002 | Jacot ....................... F03G 7/065 60/527 |
| 7,104,274 | B2 | | 9/2006 | Dille |
| 7,255,321 | B2 | | 8/2007 | Tomioka et al. |
| 7,971,651 | B2 | | 7/2011 | Tanju et al. |
| 8,387,943 | B1 | | 3/2013 | Mattheis |
| 9,206,789 | B2 | | 12/2015 | Foshansky et al. |
| 2012/0025113 | A1 | | 2/2012 | Stadelbauer et al. |
| 2019/0003609 | A1 | | 1/2019 | Asai et al. |

\* cited by examiner

1520

PASSIVE CONDUIT OR CABLE MODIFICATION DEVICE

RELATED APPLICATIONS

This application is a continuation-in-part of U.S. application Ser. No. 17/069,257, filed Oct. 13, 2020, which is incorporated herein by reference and to which priority is claimed.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Conventionally, crimping a conduit line to prevent and/or stop fluid flow through a portion of the conduit line can be an arduous and complicated process. Historically, most of the options for sealing flow paths have involved valves with dissimilar (and possibly chemically vulnerable) wetted materials that are inserted into a break in a conduit line. The conventional valves require a break in the conduit line for insertion and the valve's components, such as packing, gate, etc., are continuously in contact with the fluid in the conduit line as the fluid flows through the conduit line potentially contaminating the fluid and/or degrading the components of the valve over time. The crimping process involves using either manually operated valves, electronic components, or some level of explosives to drive structures against the conduit line to crush the conduit line. Moreover, the process involves active monitoring of the environment at the crimping device, determining whether a threshold condition is met, and then sending a signal to the crimping device to crush the pipe and/or otherwise close the flow path.

SUMMARY

The following is a brief summary of subject matter that is described in greater detail herein. This summary is not intended to be limiting as to the scope of the claims.

In an exemplary embodiment, described herein is a passive tube closure valve configured to modify a conduit line, such as closing a flow path. The passive tube closure valve comprises an elongated body extending along a first axis. The elongated body comprises a shape memory alloy with a threshold contraction along the first axis at a threshold temperature. The passive tube closure valve further comprises a passageway extending along a second axis different from the first axis. The passageway may be shaped to surround a conduit line extending along the second axis. The passive tube closure valve further includes a first modifying structure on a first portion of the passageway and a second modifying structure on a second portion of the passageway opposite the first modifying structure. The first modifying structure can be connected to a first end of the elongated body and the second modifying structure can be connected to a second end of the elongated body. Contraction of the elongated body can cause the first modifying structure and the second modifying structure to move towards each other. Movement of at least one of the first modifying structure or the second modifying structures can be configured to modify the conduit line.

A method of forming a passive tube closure valve includes a step of forming a passageway for a conduit line between two parallel elongated bodies. The elongated bodies can extend along a first axis and the passageway can extend along a second axis different from the first axis. The elongated bodies comprise a shape memory alloy with a threshold contraction along the first axis at a threshold temperature. The method can further include arranging a first modifying structure along the passageway. The first modifying structure can be connected to a first end of the elongated bodies. The method can yet further include arranging a second modifying structure along the passageway. The first modifying structure and the second modifying structure can be arranged on opposing portions of the passageway. The second modifying structure can be connected to the other end of the elongated bodies. The contraction of the elongated bodies can cause the first modifying structure and the second modifying structure to move towards each other. Movement of at least one of the first modifying structure or the second modifying structures can be configured to modify the conduit line.

Further, in accordance with various aspects, provided is a passive tube closure valve comprising two parallel elongated bodies. Each elongated body can extend along a first axis. Each elongated body comprises a shape memory alloy with a threshold contraction along the first axis at a threshold temperature. The passive tube closure valve further includes a passageway extending between the two elongated bodies. The passageway extends along a second axis different from the first axis, wherein the passageway is shaped to surround a conduit line. A first plunger on a first portion of the passageway and a second plunger on a second portion of the passageway that is opposite the first portion. Contraction of the elongated bodies can cause the first plunger and the second plunger to move towards each other to compress space in the passageway.

In a further exemplary embodiment, described herein is a passive modification device configured to modify a conduit, wherein the conduit may take any of several forms. The passive modification device comprises an elongated body extending along a first axis. The elongated body comprises a shape memory alloy with a threshold contraction along the first axis at a threshold temperature. The passive modification device further comprises a passageway extending along a second axis different from the first axis. The passageway may be shaped to surround a conduit extending along the second axis. The passive modification device further includes a first modifying structure on a first portion of the passageway and a second modifying structure on a second portion of the passageway opposite the first modifying structure. The first modifying structure can be connected to a first end of the elongated body and the second modifying structure can be connected to a second end of the elongated body. Contraction of the elongated body can cause the first modifying structure and the second modifying structure to move towards each other. Movement of at least one of the first modifying structure or the second modifying structures can be configured to modify the conduit. The conduit may take any of the following forms: an outer coaxial cable and an inner cable that passes therethrough, a cable, an electrical cable with one or more electrical conductors, an optical cable with one or more optical fibers, a conduit with a brittle portion, or one or more brittle vials.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
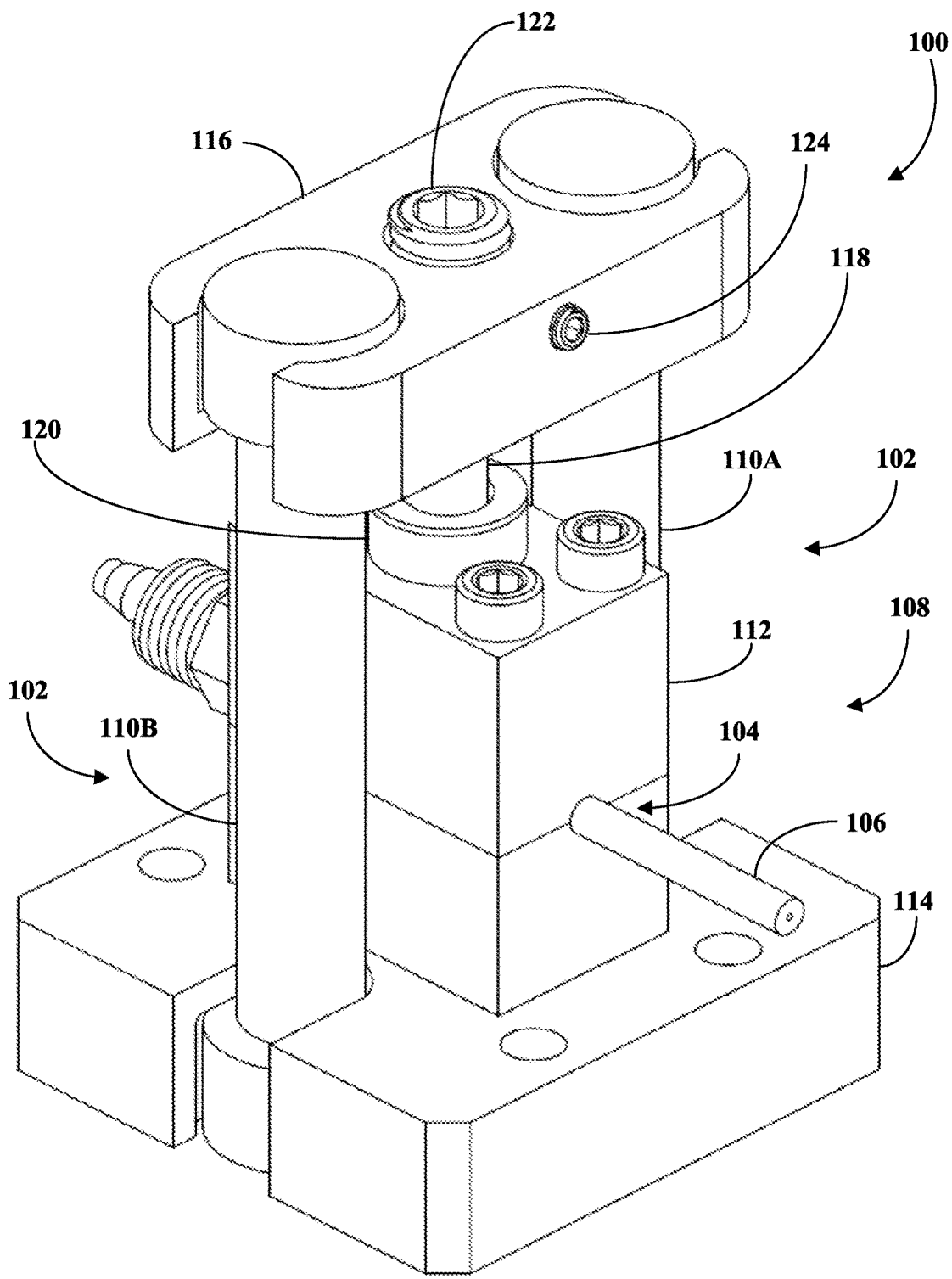
FIG. 1 illustrates an exemplary passive tube closure valve.

Various technologies pertaining to a passive tube closure valve are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an apparatus for modifying a conduit line in response to contraction of an elongated body(s). Conventionally, modifying the conduit line involves electronic or explosive components to drive structures into the conduit line to crimp it or requires a break in the conduit line for a valve to be inserted and the valve's components, such as packing, gate, etc., are continuously in contact with the fluid in the conduit line as the fluid flows through the conduit line potentially contaminating the fluid and/or degrading the components of the valve over time. Instead, the described apparatus uses an elongated body(s) that passively contracts in response to a particular environmental condition to drive modifying structures against the conduit line to crimp it. The crimping can prevent flow of fluid within the conduit line and/or prevent movement of a cable within the conduit line. For instance, the conduit line may comprise a coaxial cable and sufficient crimping of the outer conduit prevents movement of the inner cable. This has applications in the aerospace (mechanical wire operated controls), automotive (throttle cables, etc.), nuclear (mechanically operated damper gates), and other industries.

Turning to FIG. 1, illustrated is an exemplary embodiment of a modification valve 100 configured to modify a conduit line. The modification valve 100 comprises an elongated body 102 formed of a material that changes shape based on the external environment, a passageway 104 to accommodate a conduit line 106, and means 108 for modifying the conduit line 106 as the elongated body 102 changes shape. Any modification can be made to the conduit line 106, such as crushing, deforming, cutting, and/or the like. For instance, as the elongated body 102 contracts due to a threshold temperature being reached, the means 108 for modifying the conduit line 106 can clamp down on the conduit line 106 crimping a portion of the conduit line 106 to prevent flow through the conduit line 106.

The elongated body 102, the passageway 104, and/or the means 108 for modifying the conduit line 106 can be placed in any suitable arrangement that results in modification of the conduit line 106 in response to the elongated body 102 changing shape. For instance, the elongated body 102 can extend along a first axis and the passageway 104 (and by extension the conduit line 106) can extend along a second axis that is different from the first axis, e.g., the first axis and the second axis are perpendicular. The means 108 for modifying the conduit line 106 can be secured to the elongated body 102; such that, as the elongated body 102 contracts along the first axis, the means 108 for modifying the conduit line 106 moves along the first axis to modify the conduit line 106.

The modification valve 100 can include any suitable number of elongated bodies 102. Moreover, the elongated bodies 102 can be placed in any suitable arrangement with respect to each other. For instance, in the embodiment illustrated in FIG. 1, the modification valve 100 includes two elongated bodies, a first elongated body 110A and a second elongated body 110B, that are arranged in parallel. The modification valve 100 may further include one or more structures that assist in holding the elongated bodies 102 in the desired arrangement. Discussion will now be made with respect to the first elongated body 110A, however, these features can be employed with regard to any of the elongated bodies 102 in the modification valve 100.

The first elongated body 110A can take any suitable shape for modifying the conduit line 106 during contraction of the first elongated body 110A. For instance, in the embodiment illustrated in FIG. 1, the first elongated body 110A has a cylindrical dumbbell shape with a thicker section at each end and a thinner section extending therebetween. In another embodiment, the elongated body can have a uniform cross-section along the length of the body. In yet another embodiment, the elongated body can be telescoping along its length. The size and/or shape of the elongated body can depend on any number of factors, such as the material(s) used to form the elongated body, the size of the modification valve 100, the size of the conduit line 106, the modification being made to the conduit line 106, and/or the like.

Moreover, the first elongated body 110A can be made of any material that changes shape based on the external environment. In one example, the material can be selected to permanently deform in response to an external condition. In another example, the material can be selected to deform in response to an external condition and then to return to a pre-deformed shape in the absence of the external condition. In one embodiment, the first elongated body 110A can be formed of shape memory alloy that deforms at one temperature and then returns to its pre-deformed shape at another temperature. For instance, the shape memory alloy can contract along a length of the first elongated body 110A at 160° C. and to return to the pre-deformed shape below that temperature. Any suitable shape memory alloy can be employed, such as nickel-titanium; copper-aluminum-nickel; alloying zinc, alloying copper, alloying gold, alloying iron, and/or the like. In another embodiment, the first elongated body 110A can be formed of a material that deforms in response to humidity, air pressure, x-ray radiation, microwave radiation, neutron flux, and/or the like.

Where the modification valve 100 comprises a plurality of elongated bodies, such as illustrated in FIG. 1, the shape and/or size of the elongated bodies can have similar shape and size or can vary. In the embodiment illustrated in FIG. 1, the first elongated body 110A and the second elongated body 110B comprise cylindrical dumbbell shaped bodies of similar size. Moreover, the plurality of elongated bodies can be made of similar material and/or the material can vary. For instance, the first elongated body 110A and the second elongated body 110B can both be made of a nickel titanium shape memory alloy. In another example, the first elongated body 110A is made of a first material and the second elongated body 110B is made of a second material that is different from the first material.

The passageway 104 can be formed by any suitable structures for holding the conduit line 106 for modification by the modification valve 100. More particularly, the passageway 104 can be configured to restrain the conduit line 106 in a particular position to permit modification of the conduit line 106 by the modification valve 100. In the embodiment illustrated in FIG. 1, the passageway 104 is formed by a first passageway component 112 and a second passageway component 114 that are secured to each other, such as via a bolt as illustrated in FIG. 1. The first passageway component 112 and the second passageway component 114 can each have an indentation that when aligned form the passageway 104. The indentation can take any suitable shape for forming the passageway 104 and the shape and/or size of the passageway 104 may depend on the conduit line 106 or may be independent thereof.

The passageway 104 can be secured to the elongated body 102 to maintain the orientation of the conduit line 106 with respect to the elongated body 102 as the elongated body 102 contracts. For instance, the first passageway component 112 and/or the second passageway component 114 can be shaped to surround and/or enclose a portion of the first elongated body 110A and/or a portion of the second elongated body 110B to secure the passageway 104 at a particular orientation. In the embodiment illustrated in FIG. 1, the second passageway component 114 is shaped to surround and accommodate a thicker end of the first elongated body 110A and a thicker end of the second elongated body 110B.

As briefly mentioned above, the modification valve 100 can include structure(s) that help secure a plurality of elongated bodies 102 in a particular arrangement. Because the second passageway component 114 is secured to an end of both the first elongated body 110A and the second elongated body 110B; in addition to securing the passageway 104, the second passageway component 114 can hold the first elongated body 110A and the second elongated body 110B in the parallel arrangement. The modification valve 100 may further include a stabilizer bar 116 to assist in aligning the first elongated body 110A and the second elongated body 110B. The stabilizer bar 116 can be attached to any suitable portion(s) of the first elongated body 110A and/or the second elongated body 110B. For instance, in the illustrated embodiment, the stabilizer bar 116 is secured at a thicker end of the first elongated body 110A and a thicker end of the second elongated body 110B.

In addition to assisting in aligning the first elongated body 110A and the second elongated body 110B, the stabilizer bar 116 can be designed to transmit force resulting from contraction of the first elongated body 110A and/or the second elongated body 110B to the means 108 for modifying the conduit line 106. To this end, the modification valve 100 may further include a pole 118 extending between the stabilizer bar 116 and the means 108 for modifying the conduit line 106. The modification valve 100 may further include a centering structure 120 at the first passageway component 112 that helps center the pole 118 for contact with the means 108.

In order to maximize the amount of force used to modify the conduit line 106, the pole 118 can be preloaded to cause the means 108 to abut against the conduit line 106. The pole 118 can be preloaded by any suitable mechanism. In the illustrated embodiment, a screw 122 is threaded through the stabilizer bar 116 and presses on the pole 118. The screw 122 can be selectively rotated in the stabilizer bar 116 to achieve a desired preload on the pole 118. In order to prevent the preload inadvertently increasing and/or decreasing, the screw 122 can be secured in a specific position within the stabilizer bar 116. For instance, a locking adhesive may be applied to the screw 122 and/or threads in the stabilizer bar 116. In another example, a second screw 124 extends through a side of the stabilizer bar 116 to intercept the screw 122.

The means 108 for modifying the conduit line 106 can take any suitable shape and/or comprise any suitable structure(s) for modifying the conduit line 106. The shape and/or structure(s) of the means 108 may depend on the desired modification being made to the conduit line 106. In one example, the means 108 can be shaped to crimp the conduit line 106. In another example, the means 108 can be shaped to sever the conduit line 106.

Figure 2:
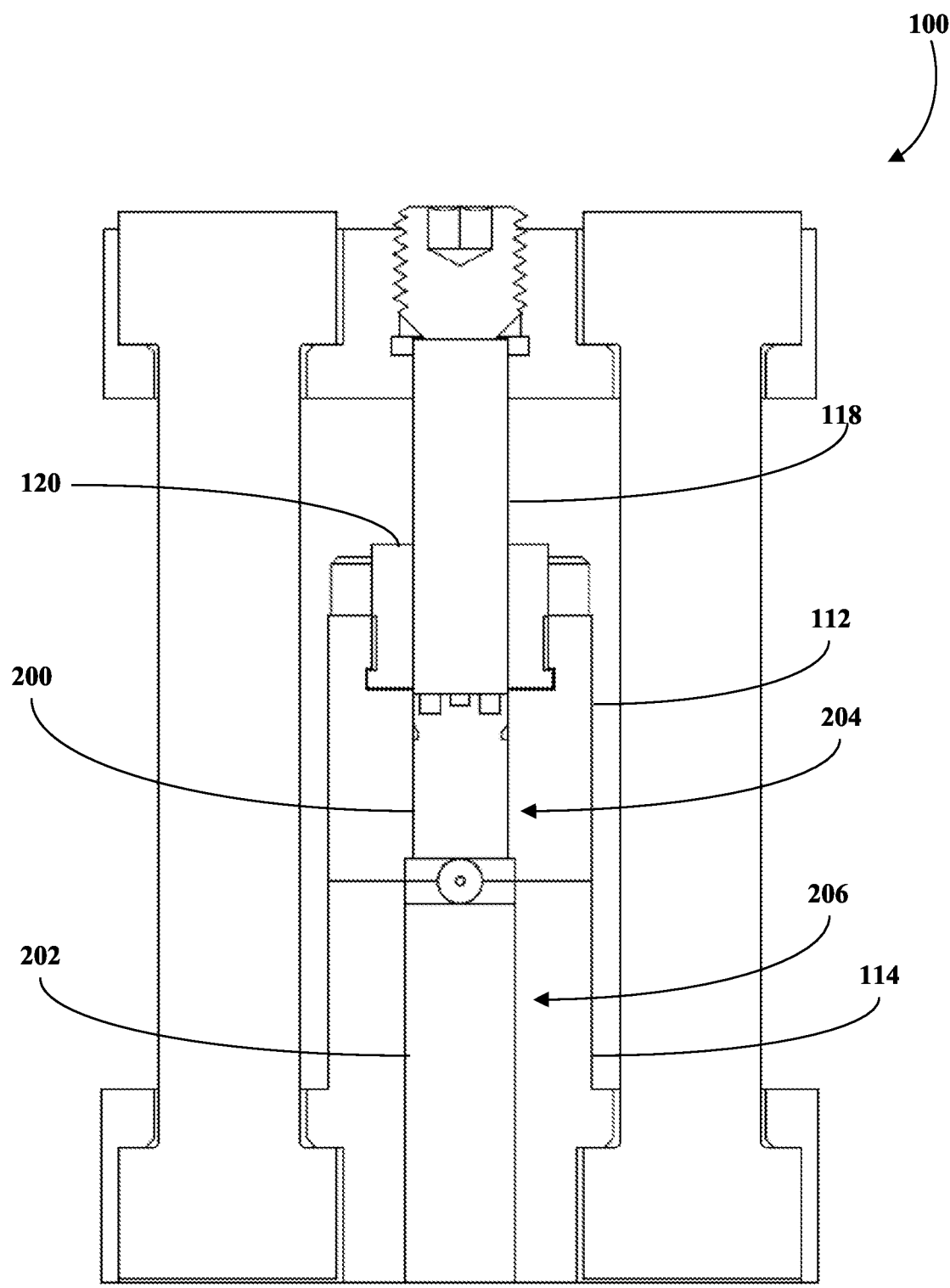
FIG. 2 illustrates another exemplary passive tube closure valve.

Turning now to FIG. 2, illustrated is a cross-section of the modification valve 100. In the illustrated embodiment, the means 108 comprises a first modifying structure 200 arranged on a first portion of the passageway 104 and a second modifying structure 202 arranged on a second portion of the passageway 104. The first portion and the second portion may be opposite one another, as illustrated, or may be non-opposite as desired.

The first modifying structure 200 may be held in place at the first portion by way of the first passageway component 112. Similarly, the second modifying structure 202 may be held in place at the second portion by way of the second passageway component 114. More particularly, the first passageway component 112 may include a bore 204 extending from an outer surface to its indentation shaped to accommodate the first modifying structure 200. The first modifying structure 200 may extend for any desired length within the bore 204. In the illustrated embodiment, the first modifying structure 200 extends along a portion of the bore 204 and the pole 118 extends along the remaining portion of the bore 204. The bore 204 may have a uniform cross-section along its length or the cross-section may vary. For instance, in the illustrated embodiment, the bore 204 includes a first section with a first cross-section to accommodate the first modifying structure 200 and the pole 118 and a second portion with a second larger cross-section that accommodates both the pole 118 and the centering structure 120 that surrounds the pole 118.

In another example, the second passageway 114 may similarly include a bore 206 extending from an outer surface to its indentation shaped to accommodate the second modifying structure 202. Similar to the first modifying structure 200, the second modifying structure 202 can extend for any desired length within the bore 206. In the illustrated embodiment, a portion of the second modifying structure 202 extends along the entire length of the bore 206. The second modifying structure 202 may be secured within the bore 206 by any suitable structure and may also be preloaded similar to the pole 118 discussed above.

As mentioned above, the first modifying structure 200 and the second modifying structure 202 can take any suitable shape for modifying the conduit line 106. The shape and/or size may depend on the desired modification being made to the conduit line 106. For instance, the first modifying structure 200 may have a first shape for a first type of modification and a second shape for a second type of modification.

Figure 3:
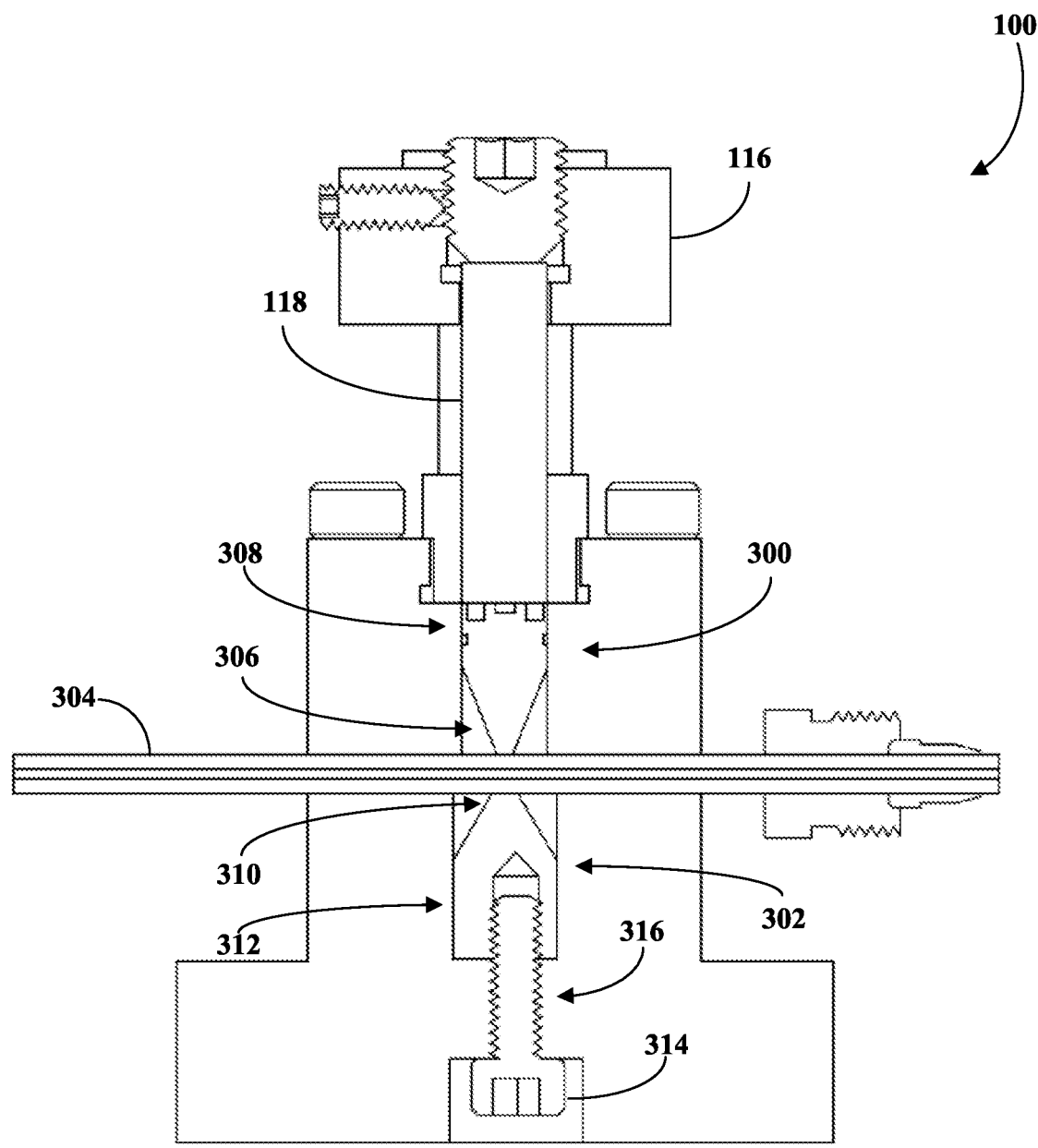
FIG. 3 illustrates yet another exemplary passive tube closure valve.

Turning to FIG. 3, illustrated is an embodiment where a first modifying structure 300 and a second modifying structure 302 are shaped for crimping a conduit line 304 as the elongated body(s) contracts. More particularly, the first modifying structure 300 comprises a plunger with a conical cross-section with a first narrow portion 306 that is adjacent the conduit line 304 and a second wider portion 308 that is adjacent the pole 118. The first portion 306 can be shaped to press on the conduit line 304 without severing it. In particular, a surface of the first portion 306 that presses on the conduit line 304 is flat to increase contact surface area with the conduit line 304.

As mentioned above, the second modifying structure 302 can have a cross-section similar to the first modifying structure 300 or it can vary. In the illustrated embodiment, similar to the first modifying structure 300, the second modifying structure 302 has a conical cross-section with a first narrow portion 310 that is adjacent the conduit line 304 and a second wider portion 312. The first portion 310 can also be shaped to press on the conduit line 304 without severing it. Similar to the first portion 306 of the first modifying structure 300, a surface of the first portion 310 that presses on the conduit line 304 is flat. The flat surface of the first portion 310 in the second modifying structure 302 can be similar in size to the flat surface of the first portion 306 of the first modifying structure 302 or can vary, as illustrated.

The flat surface of the first portion 306 of the first modifying structure 300 and/or the flat surface of the first portion 310 in the second modifying structure 302 can each be placed in contact with the conduit line 304 prior to contraction of the elongated body(s). As mentioned above, by placing the first modifying structure 300 and/or the second modifying structure 302 in contact with the conduit line 304 prior to contraction of the elongated body(s), the modification valve 100 can maximize the amount of force transmitted from the contraction of the elongated body(s) onto the conduit line 304. Any structure and/or structures can be used to place first modifying structure 300 and/or the second modifying structure 302 in contact with the conduit line 304.

As discussed above, the pole 118 attached to the stabilizer bar 116 can be preloaded to press the first modifying structure 300 into contact with the conduit line 304. In the illustrated embodiment, a screw 314 is used to place the second modifying structure 302 in contact with the conduit line 304. More particularly, a bore 316 in the second passageway component 114 can have varied cross-sectional sizes with a first larger cross-section that accommodates the second modifying structure 302 and a smaller second cross-section that receives the screw 314 and keeps the second modifying structure 302 within the bore 316. The screw 314 can be threaded through the smaller cross-section to abut the second portion 312 of the second modifying structure 302 and/or extend into the second modifying structure 302 (as illustrated) to preload the second modifying structure 302.

Figure 4:
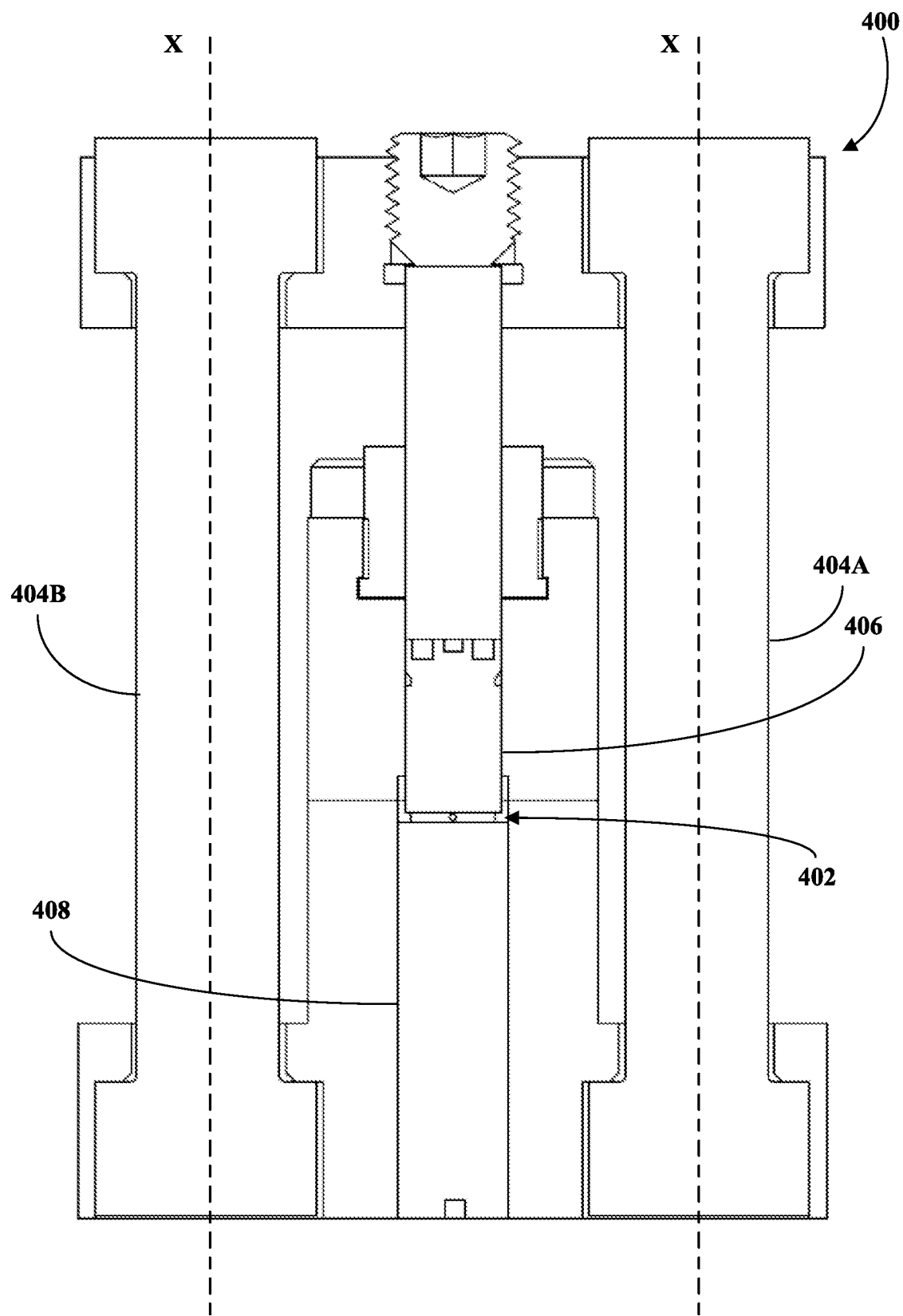
FIG. 4 illustrates a further passive tube closure valve.

Turning now to FIG. 4, illustrated is a modification valve 400 in the contracted position. In the illustrated embodiment, a portion of the conduit line 402 is crimped to prevent or limit flow through the portion of the conduit line 402. More particularly, as a first elongated body 404A and a second elongated body 404B each contract along an axis X, a first modifying structure 406 and/or a second modifying structure 408 are pressed into the conduit line 402 to crimp the portion of the conduit line 402. In one embodiment, both the first modifying structure 406 and the second modifying structure 408 move in response to the contraction of the first elongated body 404A and the second elongated body 404B. In another embodiment, the modification valve 100 can be secured such that only one of the modifying structures (e.g., the first modifying structure 406) moves as the first elongated body 404A and the second elongated body 404B contract.

Because shape memory alloy expands to return to a pre-deformed shape once the instigating condition ends, the modification valve 100 may be further configured to maintain the modification to the conduit line even after expansion. For instance, the modification valve 100 may be configured lock one or more of the modifying structures in the contracted position to prevent the conduit line from returning to an unmodified state.

Figure 5:
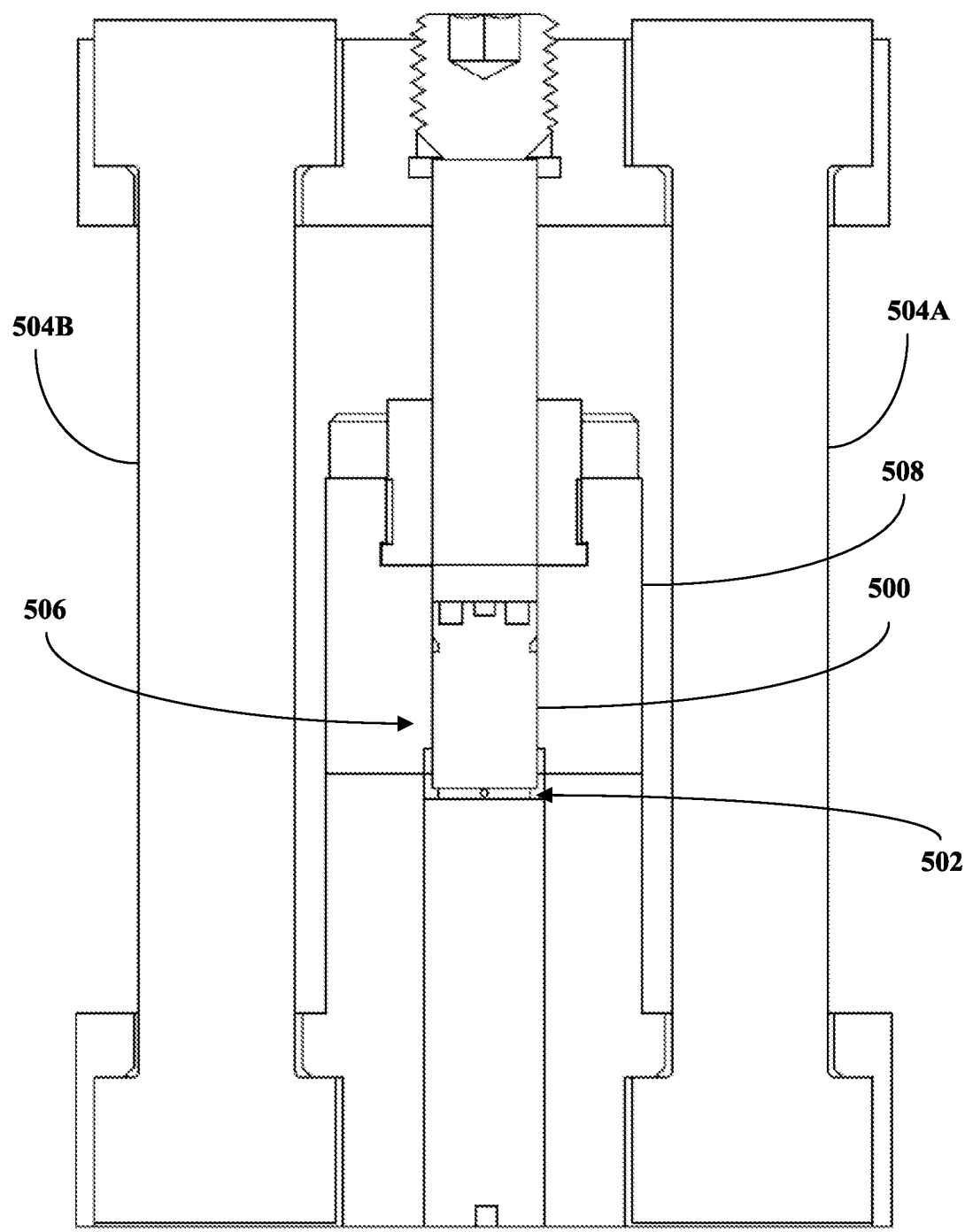
FIG. 5 illustrates a yet further exemplary passive tube closure valve.

Turning now to FIG. 5, illustrated is one embodiment where a first modifying structure 500 is locked in place subsequent to a conduit line 502 being modified. More particularly, the first modifying structure 500 remains in a contracted modifying position even after a first elongated body 504A and a second elongated body 504B return to their respective pre-deformed shapes. The first modifying structure 500 can be locked in this contracted modifying position via any suitable locking system. For instance, the locking system may comprise structure(s) extending from an inner wall of a bore 506 in a first passageway component 508 that engages an indentation in the first modifying structure 500 when the first modifying structure 500 is in the contracted modifying position illustrated in FIG. 5. The interaction of the structure and the indentation can prevent the first modifying structure 500 from moving. In another embodiment, the inner wall of the bore 506 may have one or more barbs that extend from the inner wall of the bore 506 and the first modifying structure 500 includes a corresponding barb(s) that interlocks with the barb(s) in the bore 506 at the contracted modifying position to prevent movement of the first modifying structure 500. In a further embodiment, the first modifying structure 500 and/or the bore 506 may be tapered such that interaction of the tapered surface(s) at the contracted modifying position requires a threshold amount of force (e.g., 30,000 lbs. of force) to move the first modifying structure 500 from the contracted modifying position. In a yet further example, multiple different locking system types can be used simultaneously.

Figure 6:
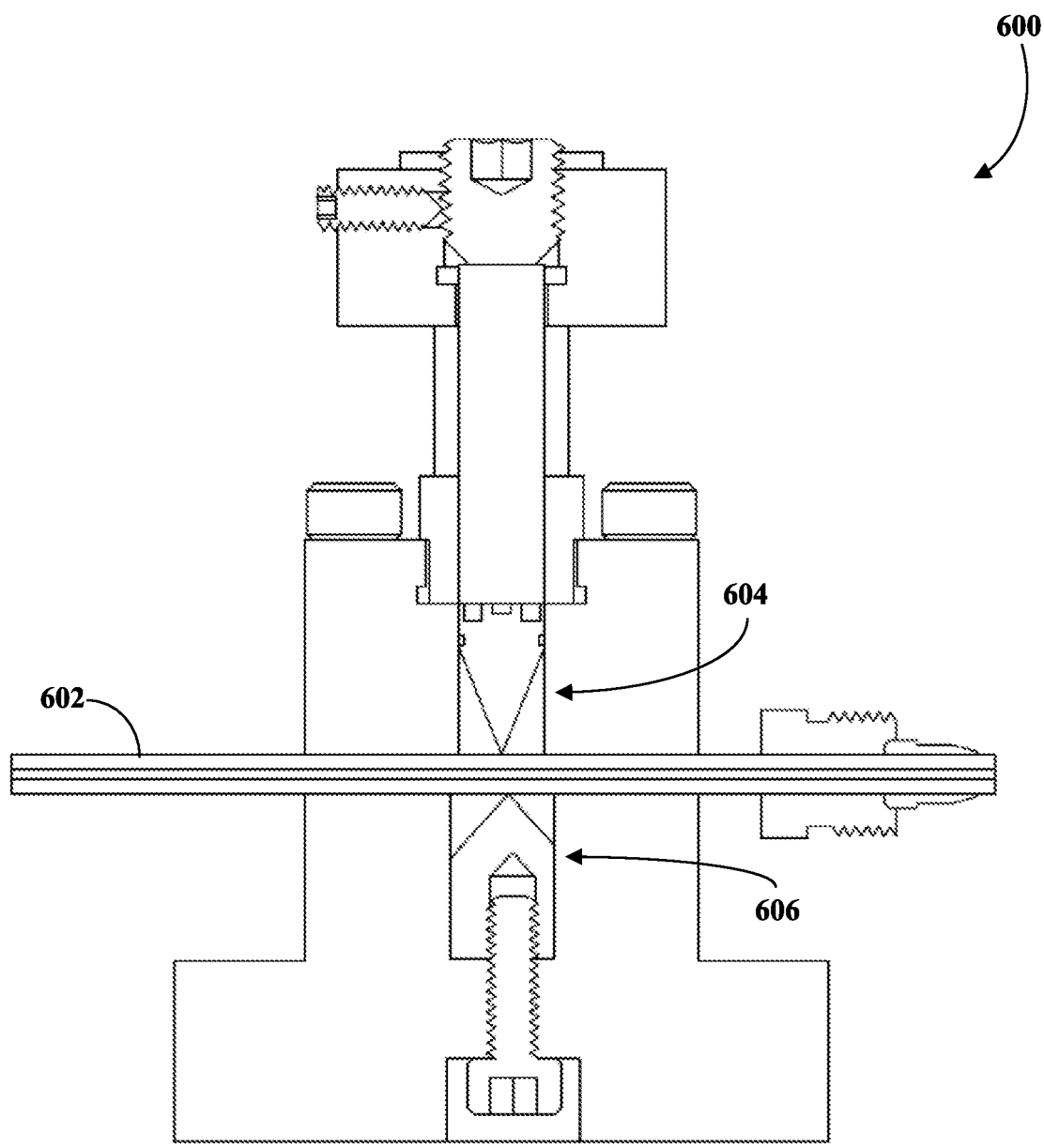
FIG. 6 illustrates another exemplary passive tube closure valve.

As briefly mentioned above, different modifications can be made to the conduit line via the modification valve 100. For instance, illustrated in FIG. 6 is a modification valve 600 configured to sever a conduit line 602. The modification valve 600 can include a first modifying structure 604 with a sharp edge in contact with the conduit line 602 and a second modifying structure 606 with a sharp edge in contact with the conduit line 602. The sharp edge of the first modifying structure 604 and the sharp edge of the second modifying structure 606 may be opposite one another and/or may be offset from one another to shear the conduit line 602. To minimize potential for unintentional severing of the conduit line 602, the sharp edge of the first modifying structure 604 and/or the sharp edge of the second modifying structure 606 may have a small amount of rounding. The rounding can be used to prevent severing of the conduit line 602 by the first modifying structure 604 and/or the second modifying structure 606 prior to contraction of the elongated body(s) in the modification valve 600.

Figure 7:
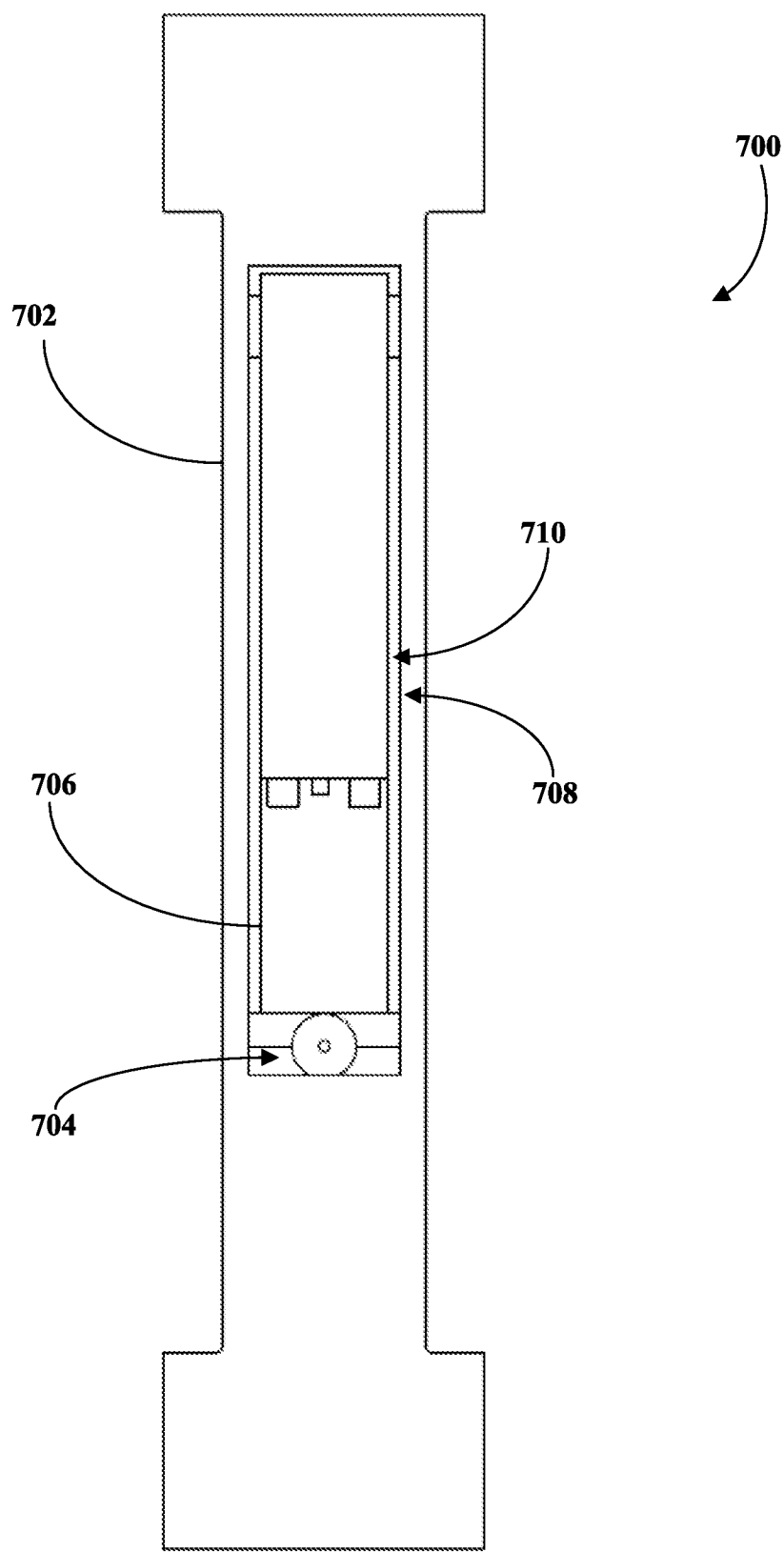
FIG. 7 illustrates yet another exemplary passive tube closure valve.

As briefly mentioned above, the elongated body(s), the means for modifying the conduit line, and the passageway can be arranged in any suitable arrangement. Illustrated in FIG. 7 is an embodiment of a modification valve 700 where the modifying structure and the passageway are located within the elongated body. More particularly, the modification valve 700 includes an elongated body 702 with a passageway 704 extending through the elongated body 702 and a modifying structure 706 within an interior of the elongated body 702. In order to accommodate the modifying structure 706, the elongated body 702 includes a bore 708 extending within the interior of elongated body 702. The bore 708 can take any suitable size and/or shape for accommodating the modifying structure 706. The bore 708 can extend to accommodate a pole 710 (similar to the pole described above) that presses on the modifying structure 706 and transfers force generated by contraction of the elongated boy 702 to the modifying structure 706.

Figure 8:
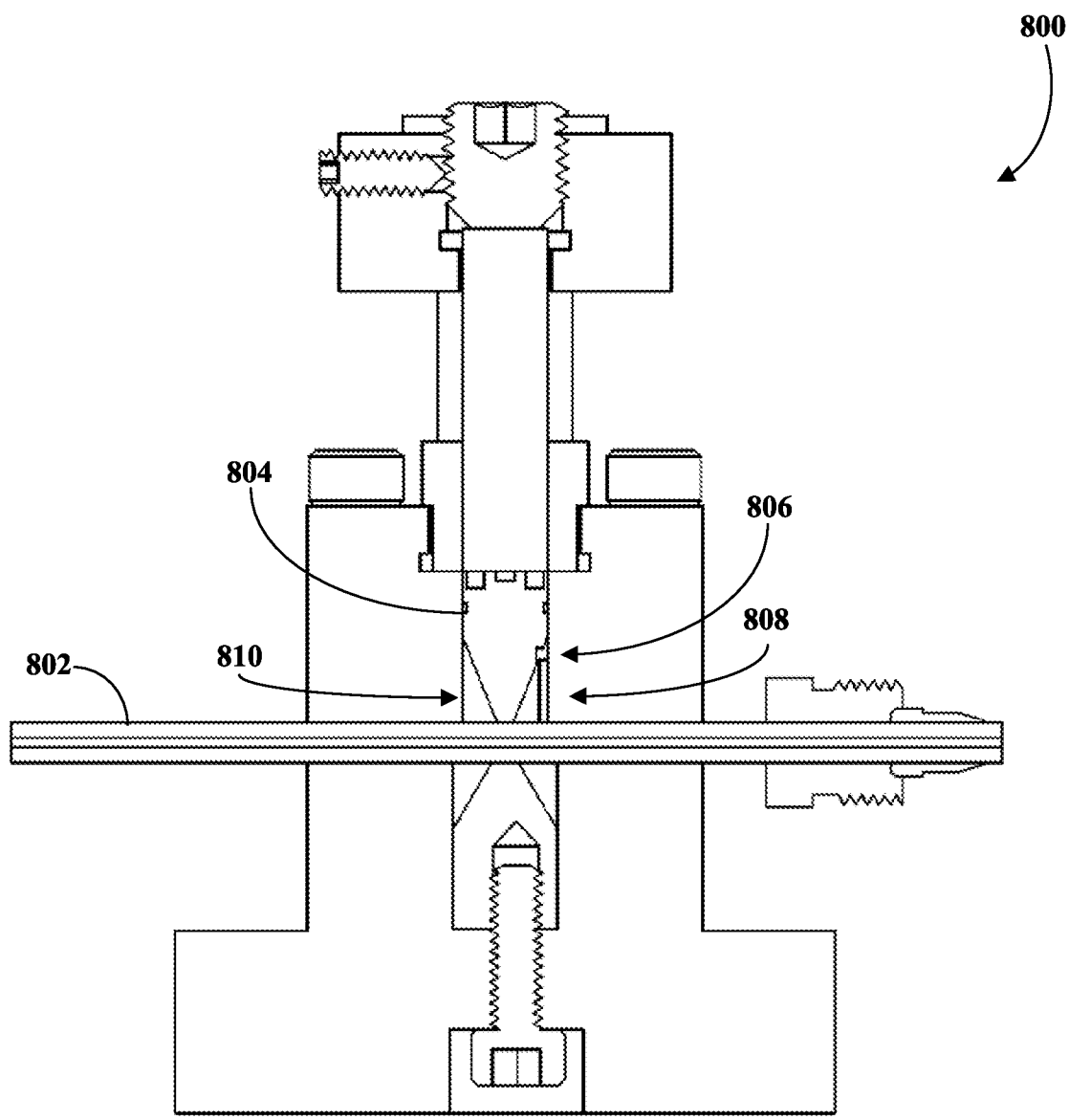
FIG. 8 illustrates a further exemplary passive tube closure valve.

The modification valve can be further configured to partially modify the conduit line. For instance, instead of crimping the conduit line to fully prevent flow through the conduit line, the modification valve can be configured to partially crimp the conduit line. Turning to FIG. 8, illustrated is a modification valve 800 configured to partially crimp a conduit line 802. The modification valve 800 includes a modifying structure 804 with an indentation 806 that interacts with a step 808 in bore 810 to prevent further downward movement of the modifying structure 804.

Figure 9:
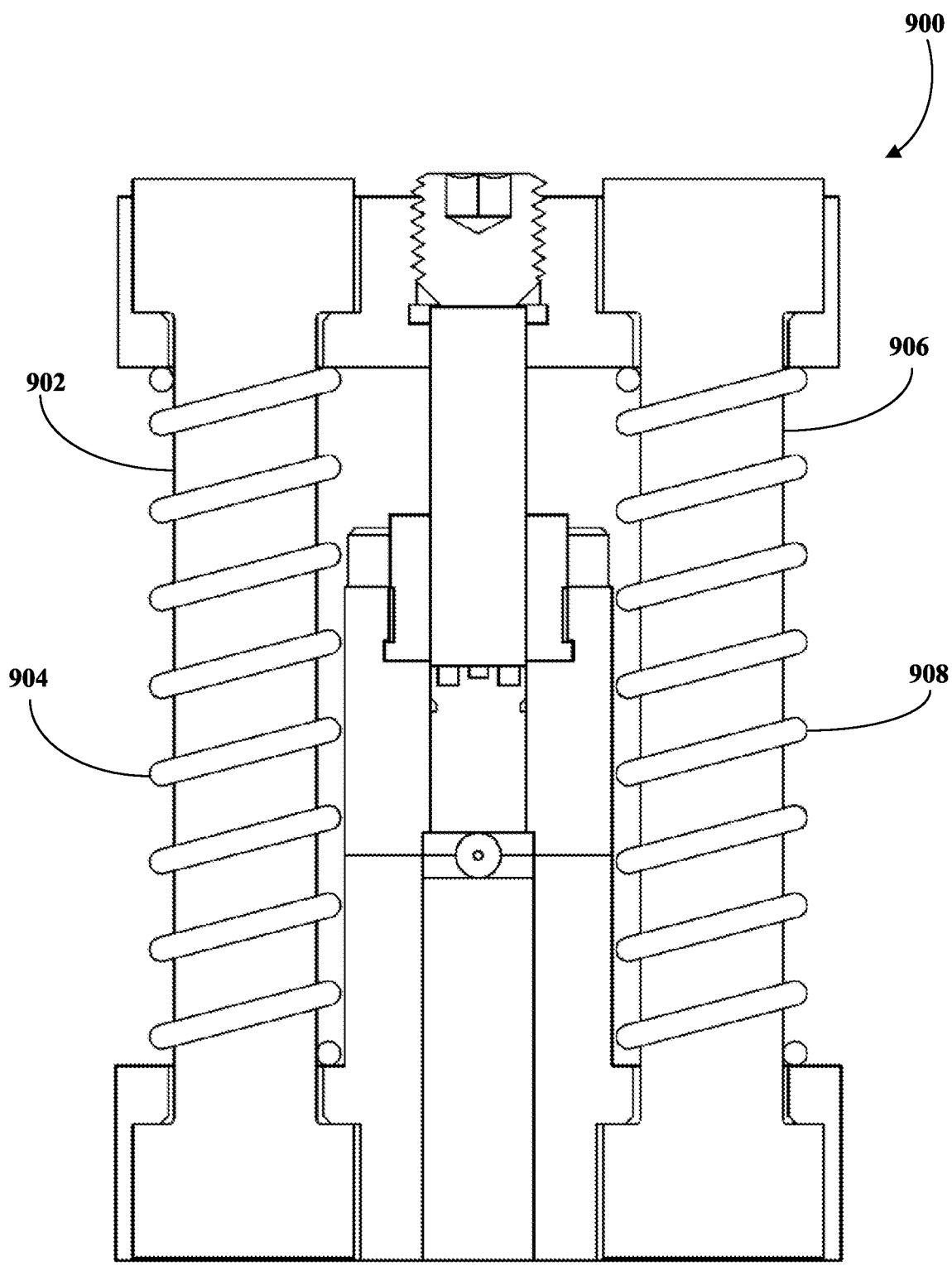
FIG. 9 illustrates a yet further exemplary passive tube closure valve.

In the previous embodiments, contraction of the elongated body(s) relied on the external environment. In another embodiment, the modification valve includes a mechanism(s) to cause contraction of the elongated body(s). The modification valve with the mechanism(s) can be employed in environments where it is desirable to have more control over when the elongated body(s) contracts. Illustrated in FIG. 9 is a modification valve 900 with mechanisms to warm an elongated body(s) to a threshold temperature to cause contraction of the elongated body(s). More particularly, the modification valve 900 includes a first elongated body 902 with a first heater 904 secured thereto and a second elongated body 906 with a second heater 908 secured thereto. The first heater 904 and/or the second heater 908 permits for temperature control of the first elongated body 902 and the second elongated body 906, respectively, to control when the first elongated body 902 and/or the second elongated body 906 contract.

The modification valve may be further configured to send fluid traveling in the conduit line to a second location during the modification. For instance, the modification valve may include a second passageway to transfer the fluid to the second location. The second location can comprise a vent to release the fluid and/or a valve to send the fluid to a second conduit line. For instance, the modification valve can vent a gas from the conduit line at a particular temperature.

Figure 10:
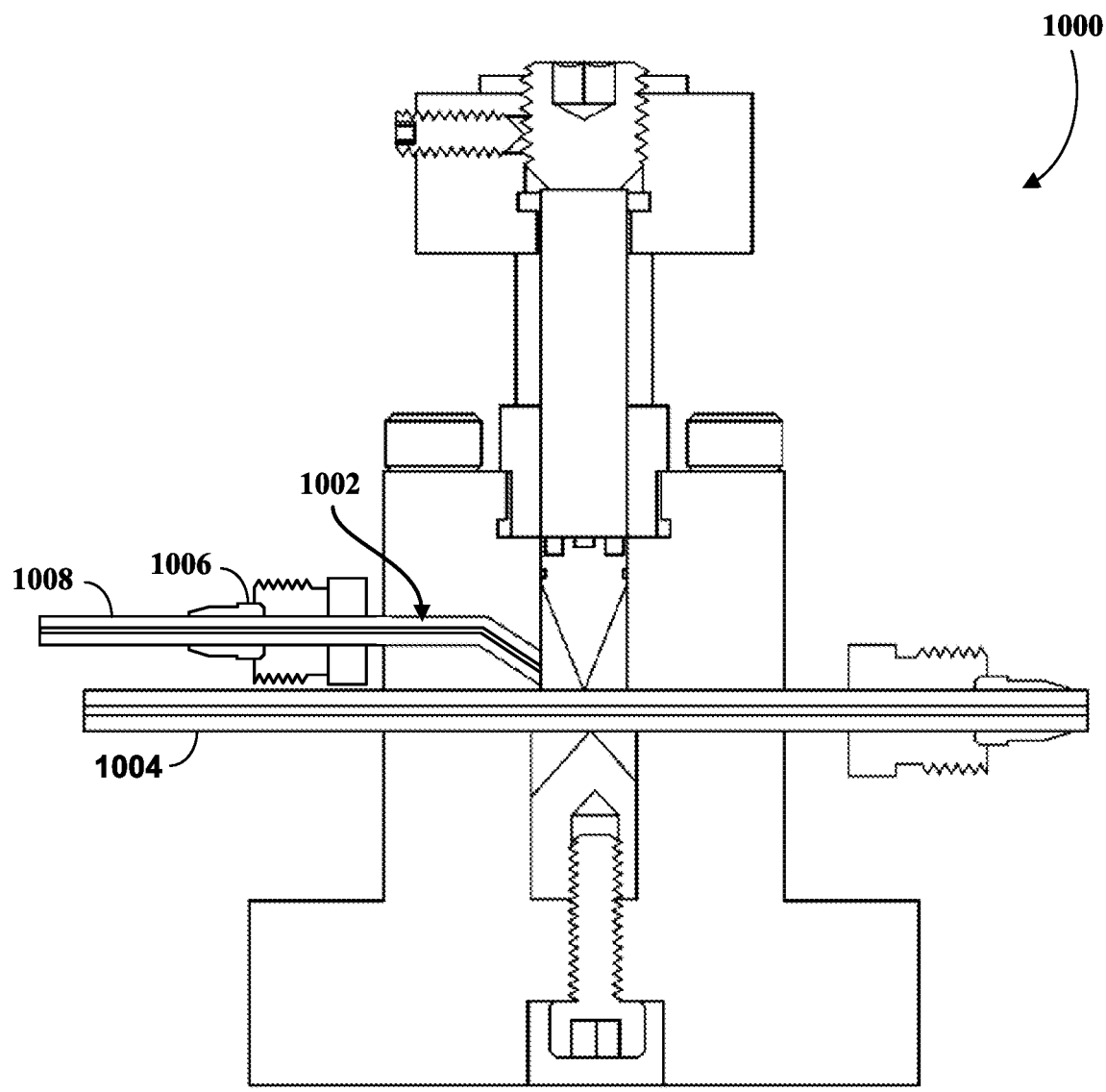
FIG. 10 illustrates another exemplary passive tube closure valve.

Turning to FIG. 10, illustrated is an embodiment of a modification valve 1000 with a second passageway 1002 to vent fluid from a conduit line 1004 after modification thereof. The modification valve 1000 can include modifying structure(s) that sever the conduit line 1004, such that fluid can leave the conduit line 1004 and enter the second passageway 1002. In the illustrated embodiment, the second passageway 1002 is configured to vent the fluid. Flow of the fluid from the second passageway 1002 may be controlled by a valve 1006 to a second conduit line 1008.

Figure 11:
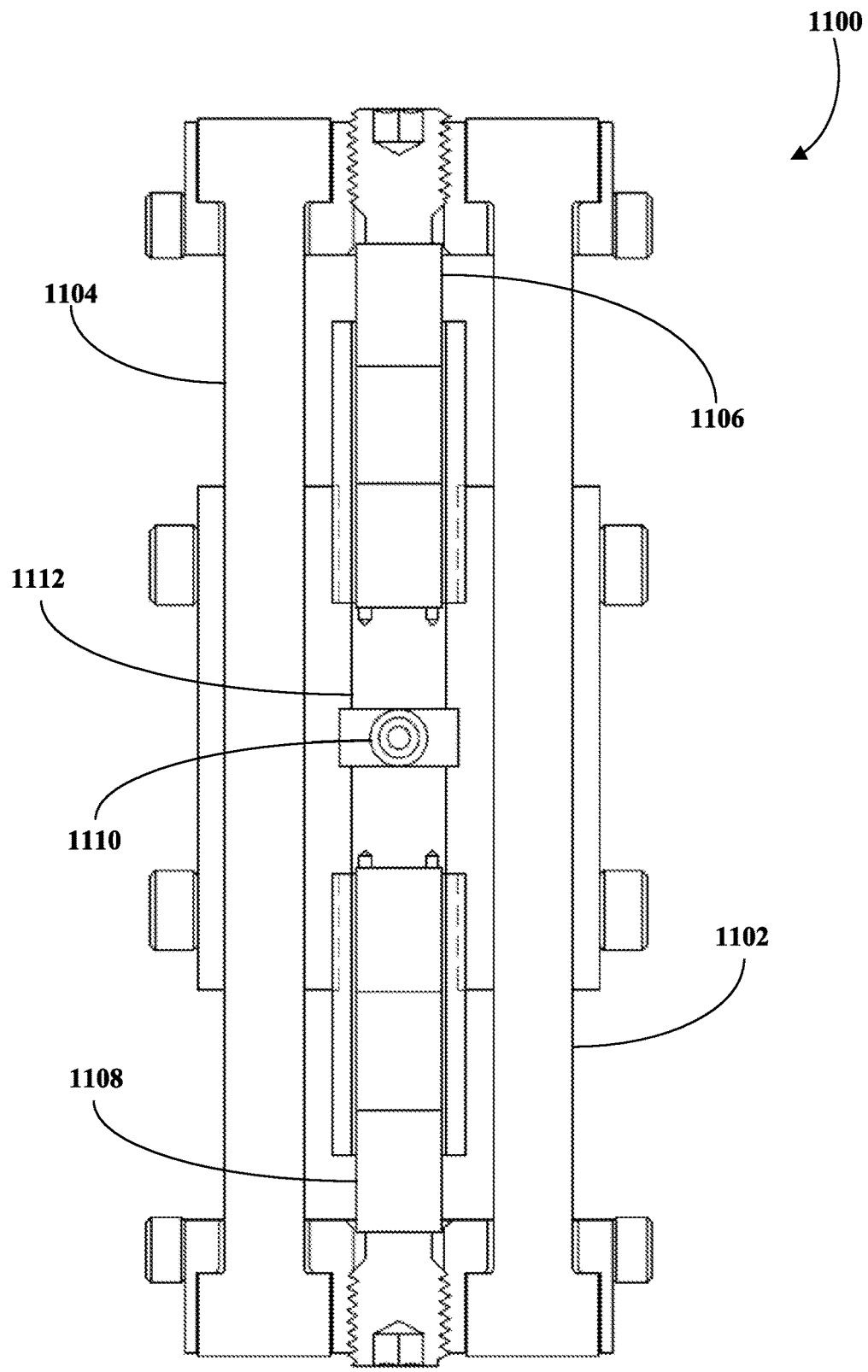
FIG. 11 illustrates a further exemplary passive tube closure valve.

In addition to or in lieu of using an elongated body formed of a material that contracts in response to a particular environmental condition, the modification valve can include an elongated body(s) that deforms by expanding in response to the particular environmental condition. Illustrated in FIG. 11 is a modification valve 1100 that includes a first elongated body 1102 and a second elongated body 1104 that are formed of a first material and a third elongated body 1106 and a fourth elongated body 1108 that are formed of a second material. The first material can be configured to contract axially in response to an environmental condition while the second material can be configured to expand axially in response to the same environmental condition. By including the axially expanding third elongated body 1106 and fourth elongated body 1108, the modification valve 1100 need not rely only on the contraction of the first elongated body 1102 and the second elongated body 1104 to modify a conduit line 1110. The expanding elongated body may be placed in suitable position within the modification valve 1100. For instance, in the illustrated embodiment, the third elongated body 1106 presses on a first modifying structure 1112 and is used in a manner similar to that of the pole described above in addition to the expansive nature of the third elongated body 1106.

The modification valve can be made of any suitable material and different material may be used for different parts of the modification valve. For instance, as described above, the elongated body(s) may be formed of a material that contracts in response to a particular environmental condition and returns to the pre-deformed shape in the absence of that condition. The material chosen may depend on the modification being made to the conduit line, the type of conduit line, the matter traveling in the conduit line, the environment the modification valve will be in, and/or the like. For instance, where the conduit line is transmitting electricity and the modification valve is configured to sever the conduit line to stop transmission, the modification valve may include insulating material to prevent transmission of the electricity within the modification valve after severing the conduit line.

Figure 12:
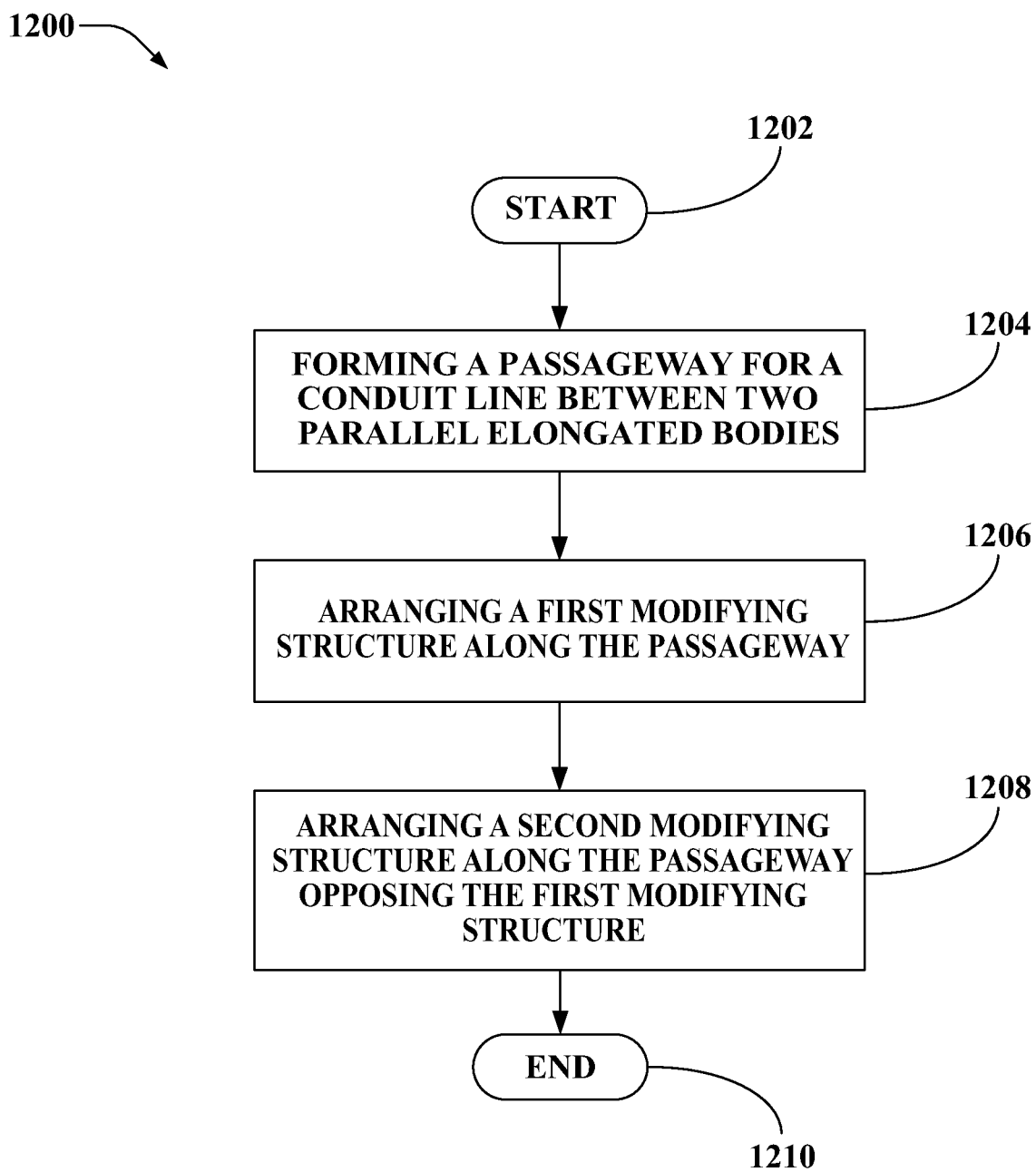
FIG. 12 is a flow diagram that illustrates an exemplary methodology for forming a passive tube closure valve.

FIG. 12 illustrates an exemplary methodology relating forming a passive tube closure valve. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Referring now to FIG. 12, an exemplary methodology 1200 is illustrated. The methodology 1200 starts at 1202, and at 1204, a passageway is formed for a conduit line between two parallel elongated bodies. The elongated bodies extend along a first axis and the passageway extends along a second axis different from the first axis. The elongated bodies comprise a shape memory alloy with a threshold contraction along the first axis at a threshold temperature. At 1206, a first modifying structure is arranged along the passageway. The first modifying structure is connected to a first end of the elongated bodies. At 1208, a second modifying structure is arranged along the passageway. The first modifying structure and the second modifying structure are arranged on opposing portions of the passageway. The second modifying structure is connected to the other end of the elongated bodies. Contraction of the elongated bodies causes the first modifying structure and the second modifying structure to move towards each other and movement of at least one of the first modifying structure or the second modifying structures is configured to modify the conduit line. The methodology 1200 concludes at 1210.

In an embodiment, the methodology 1200 further includes securing a stabilizer bar between the first end of the elongated bodies. The methodology 1200 further includes securing a pole between the stabilizer bar and the first modifying structure to connect the first modifying structure to the first end of the elongated bodies.

In one version of the embodiment, the methodology 1200 further includes preloading the pole via a screw passing through the stabilizer bar.

In another embodiment, the methodology 1200 further includes securing a heater to at least one of the elongated bodies from the two elongated bodies.

Figure 13A:
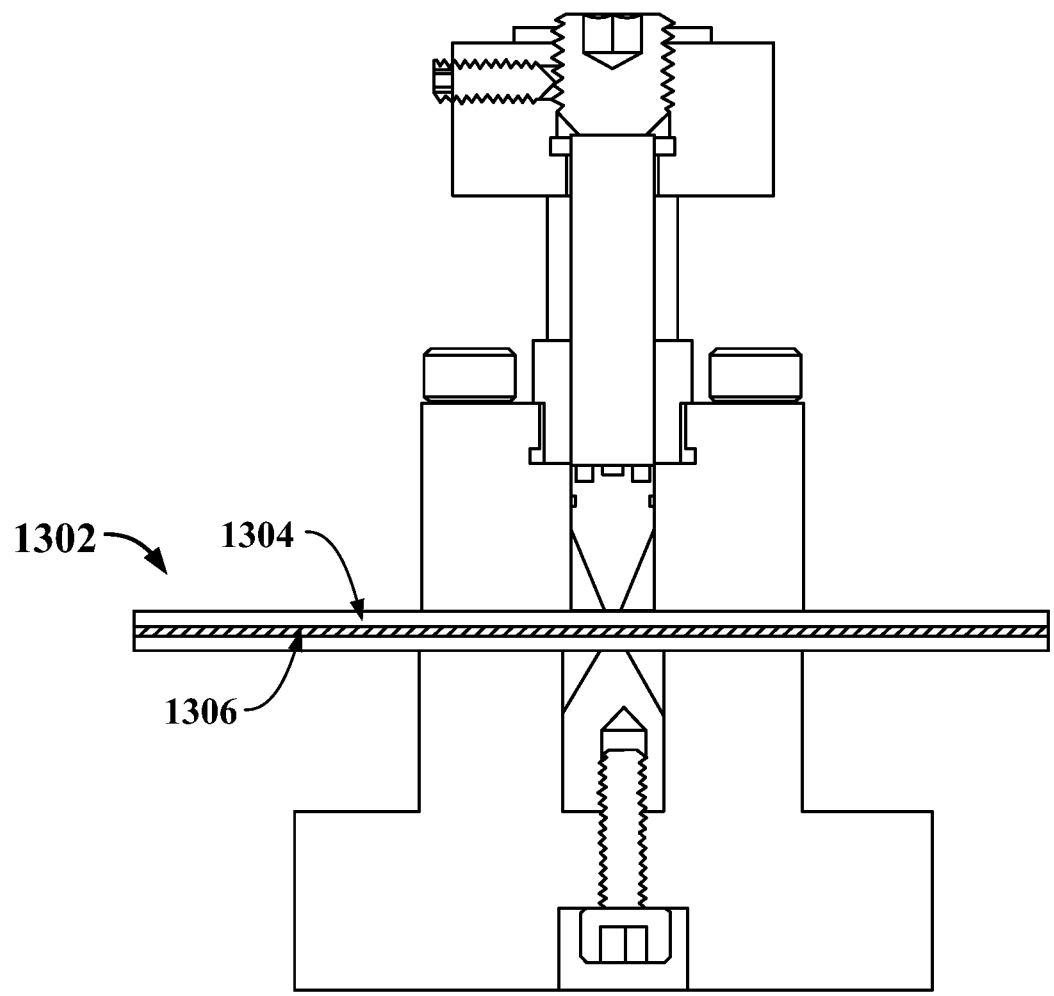
FIGS. 13A and 13B illustrate exemplary passive modification devices in which a mechanical coaxial cable is crimped or severed.
Figure 13B:
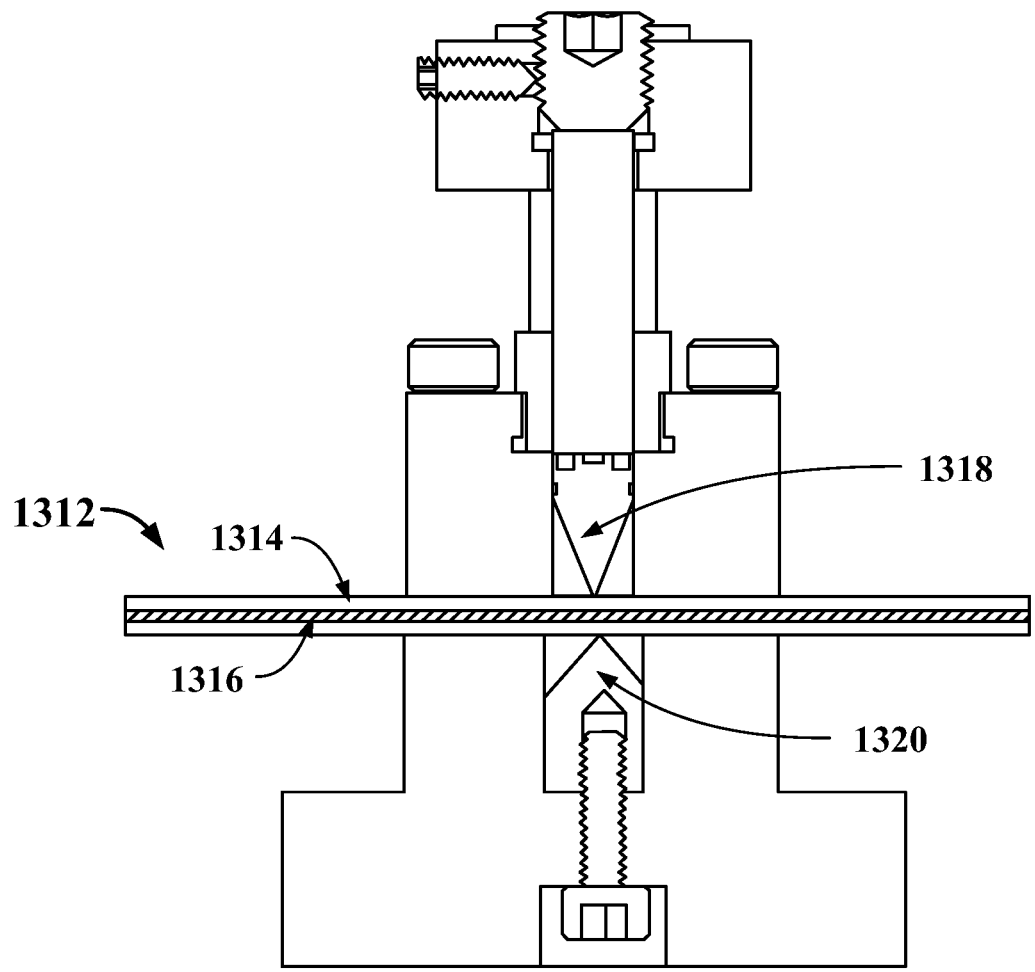

In a further embodiment of the methodology 1200, forming the passageway comprises securing a first passageway component and a second passageway component together. The first passageway component includes a bore extending from an outer surface of the first passageway component to the passageway. The bore guides movement of the first modifying structure during contraction of the elongated body As noted above, certain embodiments of a passive modification device may modify an outer coaxial cable through which an inner cable passes. For example, a passive modification device 1300 as illustrated in FIG. 13A may crimp a conduit 1302 including an outer coaxial cable 1304 and an inner cable 1306, such that movement of the inner cable 1306 therein is not possible. In a related embodiment, a passive modification device 1310 as illustrated in FIG. 13B may sever a conduit 1312 including at least one of an outer coaxial cable 1314 or an inner cable 1316 therein using a first modifying structure 1318 and a second modifying structure 1320 having sharp edges, such as those described above with reference to FIG. 6. In certain embodiments, the outer coaxial cable 1304, 1314 and the inner cable 1306, 1316 may be replaced by a single cable that is likewise either restricted from further movement (FIG. 13A) or severed (FIG. 13B). Both passive modification devices 1300, 1310 operate on mechanical cables and serve to permanently modify (crimp or sever) the conduit 1302.

Figure 14A:
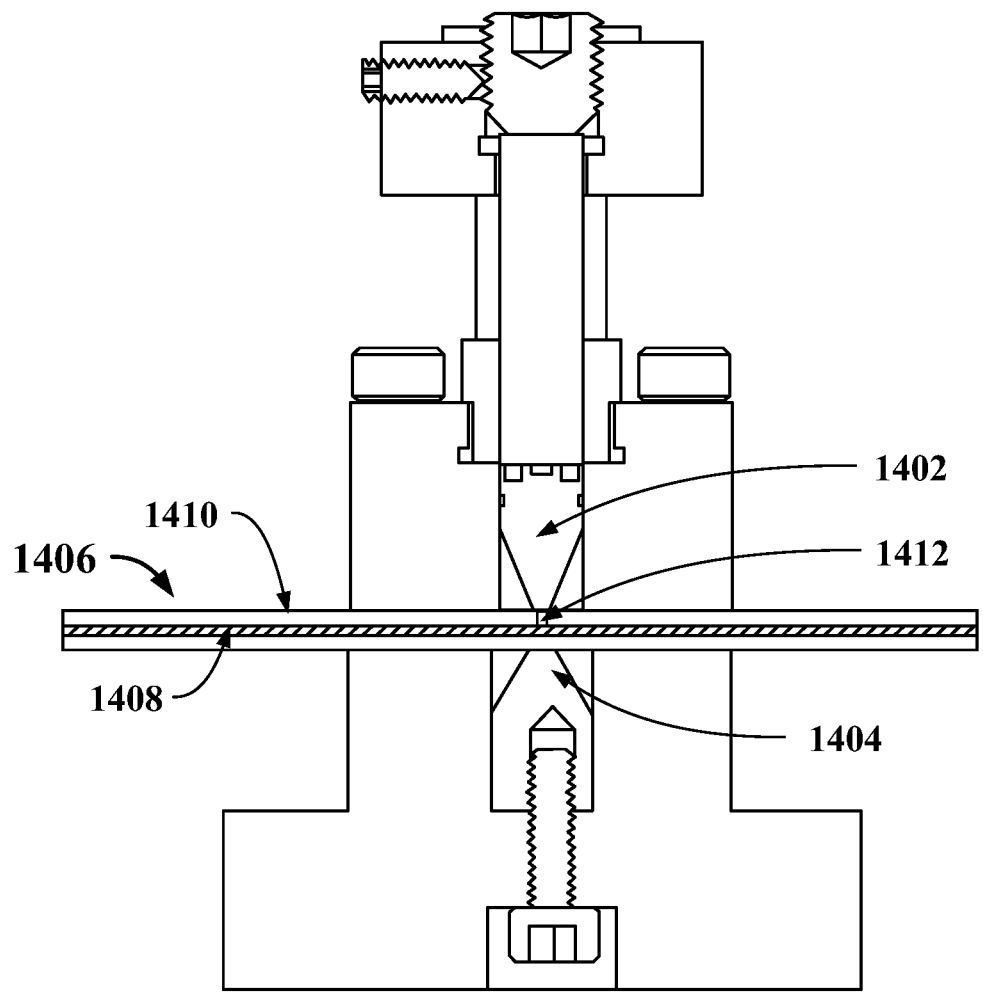
FIGS. 14A and 14B illustrate exemplary passive modification devices in which an electrical or optical cable is shorted or severed.
Figure 14B:
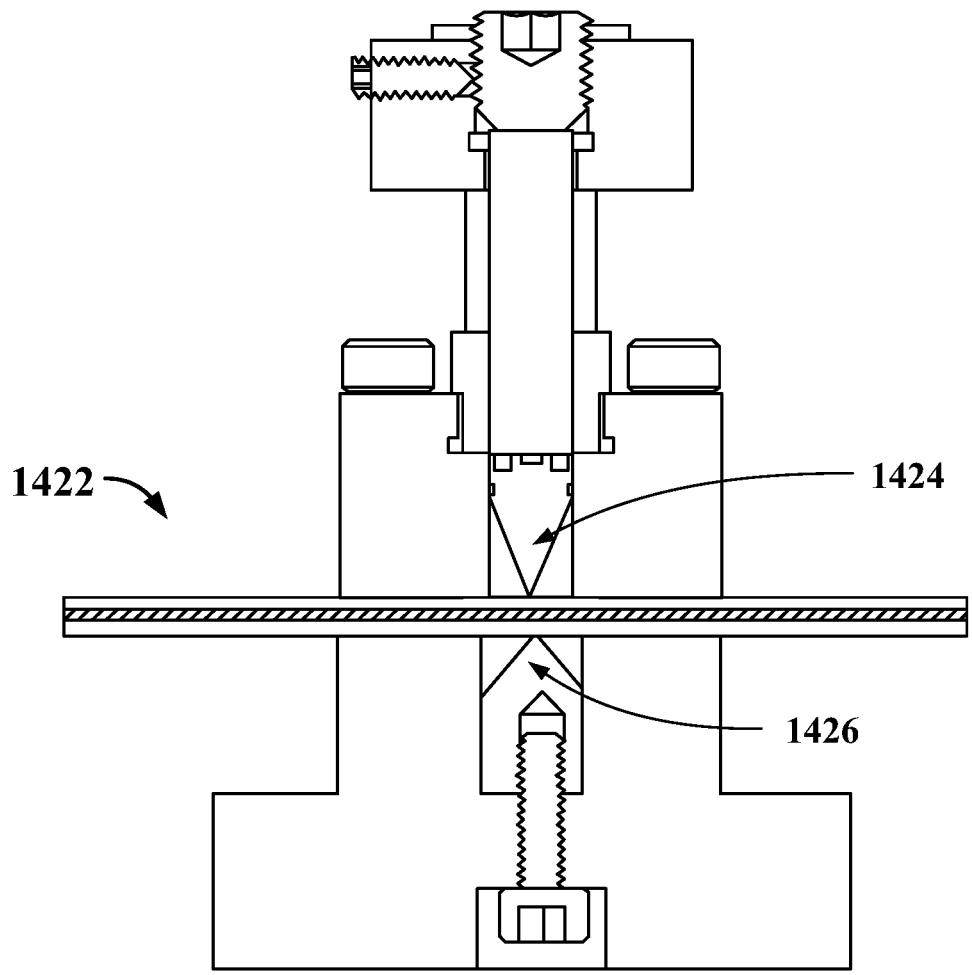

Certain embodiments of a passive modification device may alternatively operate on electrical or optical cables. FIG. 14A illustrates a passive modification device 1400 that includes a first modifying structure 1402 and a second modifying structure 1404 that, when actuated by an elongated body (not shown in this cross-sectional view) that changes shape, modifies an electrical or optical cable 1406. If the cable 1406 is a coaxial or multi-conductor electrical cable, the first modifying structure 1402 and the second modifying structure 1404 may short together all or some of the individual electrical conductors 1408 through the insulating jacket 1410. This shorting together of the individual conductors 1408 may employ, for example, tines 1412 formed on the mating surface of the first modifying structure 1402 that pierce the insulating jacket 1410. Alternatively, the first modifying structure 1402 and the second modifying structure 1404 may connect all or some of the individual electrical conductors 1408 within the multi-conductor electrical cable to a desired potential, for example, ground. If the cable 1406 is an optical cable including one or more optical fibers, the first modifying structure 1402 and the second modifying structure 1404 may cause high optical attenuation in the one or more optical fibers, for example, by crimping the one or more optical fibers. In a related embodiment, a passive modification device 1420 as illustrated in FIG. 14B may sever an electrical or optical cable 1422 using a first modifying structure 1424 and a second modifying structure 1426 having sharp edges, such as those described above with reference to FIG. 6. Both passive modification devices 1400, 1420 operate on electrical or optical cables and serve to permanently modify (short, crimp, or sever) the cable 1406.

Figure 15A:
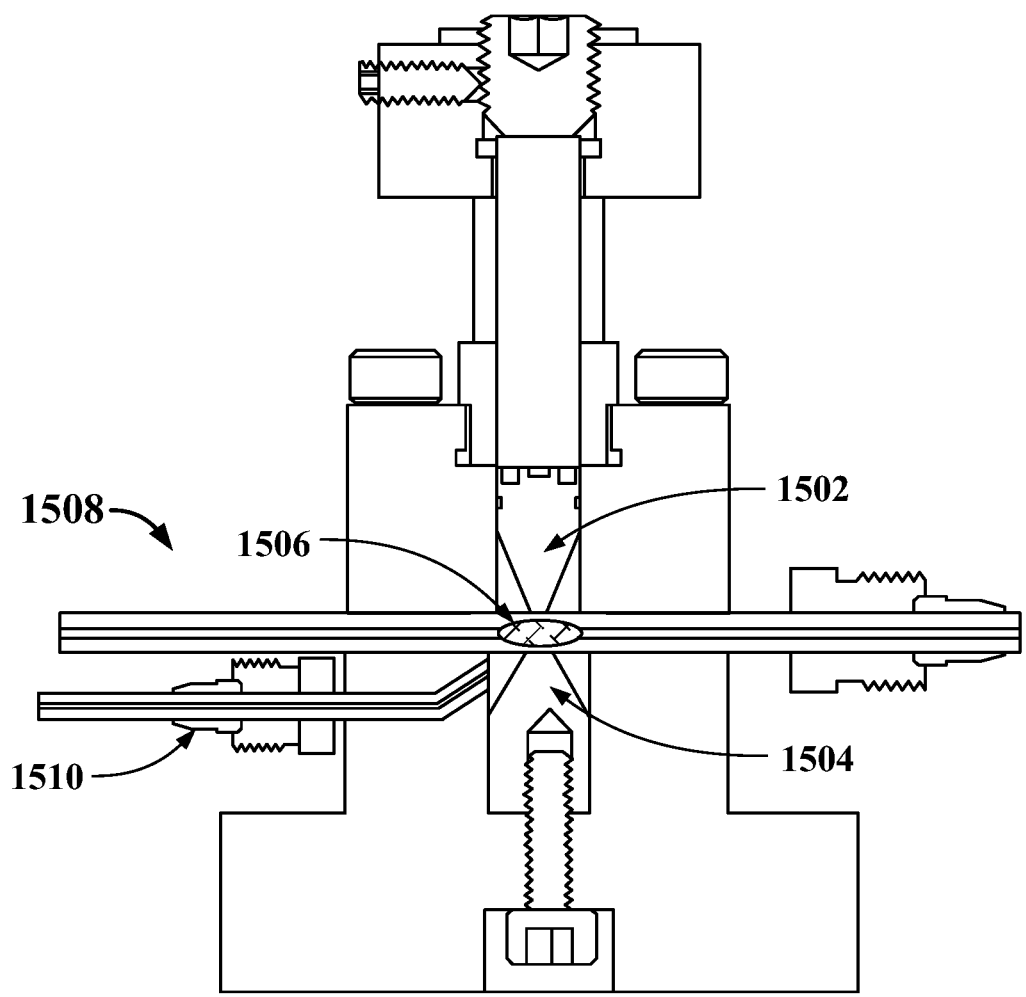
FIGS. 15A and 15B illustrate exemplary passive modification devices in which a brittle conduit or vial is shattered.
Figure 15B:
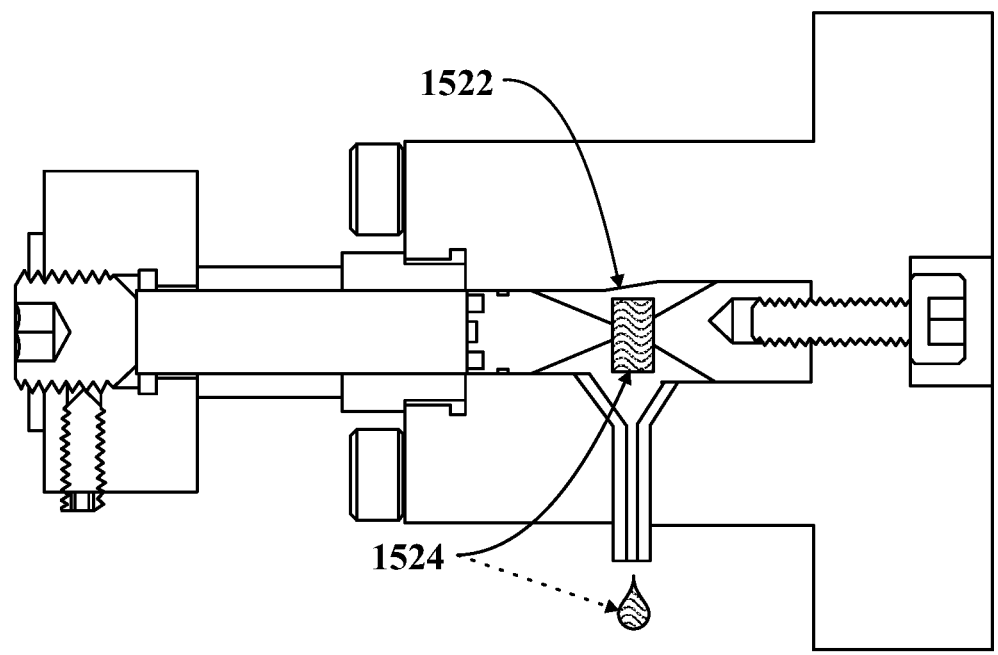

Yet other embodiments of a passive modification device may alternatively operate on one or more brittle conduits. FIG. 15A illustrates a passive brittle conduit modification device 1500. A first modifying structure 1502 and a second modifying structure 1504, when actuated by an elongated body (not shown in this cross-sectional view) that changes shape, shatters a brittle portion 1506 of a conduit 1508. By employing a conduit 1508 with a brittle portion 1506, flow through the conduit 1508 can be stopped using less force than required when the conduit is formed of just metal as the brittle section 1506 will readily shatter. This potentially enables the passive modifying device 1500 to be smaller as the elongated body need not generate as much force. The passive modifying device 1500 may be used to either prevent, or at least reduce, flow through the conduit 1508, or divert flow from the conduit 1508 to a second conduit 1510. Alternatively, a passive modifying device 1520, as illustrated in FIG. 15B may employ a brittle vial 1522 containing a chemical 1524 instead of a conduit 1510 with a brittle portion 1506. Upon actuation, the brittle vial 1522 is shattered, releasing the chemical 1524 within the brittle vial 1522. As an example, if the chemical 1524 is an acid or base, the modifying device 1520 could be placed over an object that is at least partially dissolved by, or reacts with, the chemical 1524 as the chemical 1524 drips on the object. In yet another alternative modifying device, two brittle vials may be used. In this case, as the contents of the two brittle vials mix, a desired chemical reaction can be initiated. As all three of the passive brittle modification devices 1500, 1520 operate on brittle structures, they permanently modify (shatter) the brittle structures 1506, 1522.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A passive modification device comprising:
   an elongated body extending along a first axis, wherein the elongated body comprises a shape memory alloy with a threshold contraction along the first axis at a threshold temperature;
   a passageway extending along a second axis different from the first axis, wherein the passageway is shaped to surround a cable extending along the second axis;
   a first modifying structure on a first portion of the passageway; and
   a second modifying structure on a second portion of the passageway opposite the first modifying structure;
   wherein the first modifying structure is connected to a first end of the elongated body and the second modifying structure is connected to a second end of the elongated body; and
   wherein contraction of the elongated body causes the first modifying structure and the second modifying structure to move towards each other, wherein movement of at least one of the first modifying structure or the second modifying structures is configured to permanently modify the cable.

2. The passive modification device of claim 1, wherein:
   the cable includes an outer coaxial cable and an inner cable that passes through the outer coaxial cable; and
   at least one of the first modifying structure or the second modifying structure is adapted to crimp the cable such that the inner cable cannot move within the outer coaxial cable upon contraction of the elongated body.

3. The passive modification device of claim 1, wherein:
   the cable includes an outer coaxial cable and an inner cable that passes through the outer coaxial cable; and
   at least one of the first modifying structure or the second modifying structure comprises a cutting edge adapted to sever at least one of the outer coaxial cable or the inner cable upon contraction of the elongated body.

4. The passive modification device of claim 1, wherein:
   at least one of the first modifying structure or the second modifying structure is adapted to crimp the cable such that the cable cannot move upon contraction of the elongated body.

5. The passive modification device of claim 1, wherein:
   at least one of the first modifying structure or the second modifying structure is adapted to sever the cable upon contraction of the elongated body.

6. The passive modification device of claim 1, wherein the cable includes an electrical cable, the electrical cable including one or more electrical conductors.

7. The passive modification device of claim 6, wherein at least one of the first modifying structure or the second modifying structure is adapted to short together two or more of the one or more electrical conductors upon contraction of the elongated body.

8. The passive modification device of claim 6, wherein at least one of the first modifying structure or the second modifying structure is adapted to short one or more of the one or more electrical conductors to a desired potential upon contraction of the elongated body.

9. The passive modification device of claim 6, wherein at least one of the first modifying structure or the second modifying structure comprises a cutting edge adapted to sever the electrical cable upon contraction of the elongated body.

10. The passive modification device of claim 1, wherein the cable includes an optical cable, the optical cable including one or more optical fibers.

11. The passive modification device of claim 10, wherein at least one of the first modifying structure or the second modifying structure is adapted to induce high optical attenuation in at least one of the one or more optical fibers upon contraction of the elongated body.

12. The passive modification device of claim 10, wherein at least one of the first modifying structure or the second modifying structure comprises a cutting edge adapted to sever the optical cable upon contraction of the elongated body.

13. A passive modification device comprising:
    an elongated body extending along a first axis, wherein the elongated body comprises a shape memory alloy with a threshold contraction along the first axis at a threshold temperature;
    a passageway extending along a second axis different from the first axis, wherein the passageway is shaped to surround a conduit, the conduit including a brittle portion adapted to shatter when subjected to a force;
    a first modifying structure on a first portion of the passageway; and
    a second modifying structure on a second portion of the passageway opposite the first modifying structure;
    wherein the first modifying structure is connected to a first end of the elongated body and the second modifying structure is connected to a second end of the elongated body; and
    wherein contraction of the elongated body causes the first modifying structure and the second modifying structure to move towards each other, wherein movement of at least one of the first modifying structure or the second modifying structures is configured to permanently modify the conduit.

14. The passive modification device of claim 13, wherein at least one of the first modifying structure or the second modifying structure is adapted to subject the brittle portion to a force, thereby causing the brittle portion to shatter upon contraction of the elongated body.

15. The passive modification device of claim 14, wherein:
    the passive modification device further comprises a second conduit; and when the brittle portion is shattered, a fluid flowing in the first conduit is diverted to the second conduit.

16. The passive modification device of claim 13, wherein the brittle portion includes one or more brittle vials, each of the one or more brittle vials adapted to shatter when subjected to a force.

17. The passive modification device of claim 16, wherein at least one of the first modifying structure or the second modifying structure is adapted to subject each of the one or more brittle vials to a force, thereby causing each of the one or more brittle vials to shatter upon contraction of the elongated body.

18. The passive modification device of claim 16, wherein:
each of the one or more brittle vials includes a respective chemical; and
when each of the one or more brittle vials is shattered, a chemical reaction is initiated.

19. The passive modification device of claim 1, further comprising one or more locking structures that prevent further motion of at least one of the first modifying structure or the second modifying structure upon contraction of the elongated body.

20. The passive modification device of claim 1, wherein the shape memory alloy comprises a nickel titanium alloy.

* * * * *